US009135786B2

(12) United States Patent
Sung et al.

(10) Patent No.: US 9,135,786 B2

(45) Date of Patent: Sep. 15, 2015

(54) FINANCIAL DEVICE

(71) Applicant: LG CNS CO., LTD., Seoul (KR)

(72) Inventors: Min Ho Sung, Seoul (KR); Chang Ryong Kwak, Seoul (KR)

(73) Assignee: LG CNS CO., LTD., Seoul (KR)

( * ) Notice: Subject to any disclaimer, the term of this patent is extended or adjusted under 35 U.S.C. 154(b) by 94 days.

(21) Appl. No.: 13/826,852

(22) Filed: Mar. 14, 2013

(65) Prior Publication Data

US 2013/0240620 A1 Sep. 19, 2013

(30) Foreign Application Priority Data

Mar. 15, 2012 (KR) ........................ 10-2012-0026814
Mar. 16, 2012 (KR) ........................ 10-2012-0027418

(51) Int. Cl.
*G06Q 40/00* (2012.01)
*G07F 19/00* (2006.01)

(52) U.S. Cl.
CPC .............. *G07F 19/20* (2013.01); *G07F 19/202* (2013.01); *G07F 19/203* (2013.01); *G07F 19/205* (2013.01)

(58) Field of Classification Search
CPC ..... G07F 19/20; G07F 19/202; G07F 19/207; G07F 19/203; G07F 19/205; B65H 2404/14; B65H 2220/09; B65H 2301/5121; B65H 2404/611; B65H 2701/1912; B65H 29/125; B65H 29/70; B65H 5/062; B65H 5/38
USPC ................................. 235/379, 375, 380, 382
See application file for complete search history.

(56) References Cited

U.S. PATENT DOCUMENTS

| | | | | |
|---|---|---|---|---|
| 7,000,778 | B2 * | 2/2006 | Omori et al. | 209/534 |
| 7,036,722 | B2 * | 5/2006 | Fujioka | 235/379 |
| 8,155,423 | B2 * | 4/2012 | Kagehiro et al. | 382/135 |
| 8,459,553 | B2 | 6/2013 | Bang | |
| 2002/0129256 | A1 | 9/2002 | Parmelee et al. | |
| 2004/0162870 | A1 * | 8/2004 | Matsuzaki et al. | 709/200 |
| 2005/0056693 | A1 * | 3/2005 | Yokoi et al. | 235/379 |

(Continued)

FOREIGN PATENT DOCUMENTS

| | | | |
|---|---|---|---|
| CN | 201607791 | U | 10/2010 |
| CN | 102346838 | A | 2/2012 |
| JP | 2000-311265 | A | 11/2000 |

(Continued)

OTHER PUBLICATIONS

Notice of Allownace dated Nov. 21, 2013 in Korean Application No. 10-2012-0026814.

(Continued)

*Primary Examiner* — Thien M Le

(74) *Attorney, Agent, or Firm* — Saliwanchik, Lloyd & Eisenschenk

(57) ABSTRACT

Provided is a financial device. The financial device comprise a registered medium storage box storing a medium to be registered and withdrawn, a discrimination part recognizing information of the registered medium withdrawn from the registered medium storage box, a display unit displaying a screen on which the registered medium to be withdrawn is registered, and a control part controlling the display unit. The control part acquires information of at least one registered medium stored in the registered medium storage box by using the discrimination part, and a screen for registering the registered medium to be withdrawn on which the acquired registered medium information is reflected is displayed on the display unit.

22 Claims, 11 Drawing Sheets

(56) References Cited

U.S. PATENT DOCUMENTS

| | | | | |
|---|---|---|---|---|
| 2012/0031728 | A1 | 2/2012 | Lee | |
| 2013/0240620 | A1 * | 9/2013 | SUNG et al. | 235/379 |

FOREIGN PATENT DOCUMENTS

| | | | |
|---|---|---|---|
| JP | 2001-056879 | A | 2/2001 |
| JP | 2005-004537 | A | 1/2005 |
| KR | 10-2001-0056395 | A | 7/2001 |
| KR | 10-2007-0066412 | A | 6/2007 |
| KR | 10-2008-0059984 | A | 7/2008 |
| KR | 10-1093841 | B1 | 12/2011 |

OTHER PUBLICATIONS

Office Action dated Jul. 11, 2013 in Korean Application No. 10-2012-0026814, filed Mar. 15, 2012.

Office Action dated Apr. 22, 2013 in Korean Application No. 10-2012-0027418, filed Mar. 16, 2012.

Office Action dated Oct. 30, 2014 in Chinese Application No. 201310084201.X.

* cited by examiner

FINANCIAL DEVICE

CROSS-REFERENCE TO RELATED APPLICATIONS

This application claims the benefit under 35 U.S.C. §119 of Korean Patent Application Nos. 10-2012-0026814, filed Mar. 15, 2012 and 10-2012-0027418, filed Mar. 16, 2012, which are hereby incorporated by reference in their entirety.

BACKGROUND

The present disclosure relate to a financial device.

In general, financial devices are devices for processing financial business desired by customers. Financial devices may deposit/withdraw a medium or automatically transfer a medium. For example, financial devices may deposit or withdraw an unregistered medium or a registered medium.

To process the registered medium in the financial devices according to the related art, a process of registering the registered medium in the financial devices is performed. For example, a bank teller registers a serial number of a registration medium, the number of medium, a kind of medium (hereinafter, referred to as registration medium information), and the like in a financial device. Then, when the registration medium information is inputted into the financial device, the inputted registration medium information is transmitted into and stored in a host server.

However, in the related art, the bank teller should manually input the registration medium information. Thus, if the registration medium information is entered incorrectly, the actual registration medium information withdrawn from the financial device and the registration medium information stored in the host server may be different. As a result, the registration medium withdrawn by a customer may be processed as an unregistered medium or incident registered medium.

BRIEF SUMMARY

Embodiments provide a financial device.

In one embodiment, a financial device comprises: a registered medium storage box storing a medium to be registered and withdrawn; a discrimination part recognizing information of the registered medium withdrawn from the registered medium storage box; a display unit displaying a screen on which the registered medium to be withdrawn is registered; and a control part controlling the display unit, wherein the control part acquires information of at least one registered medium stored in the registered medium storage box by using the discrimination part, and a screen for registering the registered medium to be withdrawn on which the acquired registered medium information is reflected is displayed on the display unit.

In another embodiment, a financial device comprises: a body where a medium input/output unit is formed; a registered medium storage box in which a registered medium to be withdrawn is stored; a recovery box in which portions or all of registered media to be withdrawn is recovered; a discrimination part recognizing registered medium information of the registered medium to be withdrawn; a memory in which registered medium information of a previously registered medium is stored as the registered medium to be withdrawn; and a control part recovering the registered medium withdrawn from the registered medium storage box into the recovery box when the registered medium information withdrawn from the registered medium storage box and recognized by the discrimination part and the registered medium information corresponding to the registered medium withdrawn from the registered medium storage box among the registered media stored in the memory are different from each other, according to withdrawal request of the registered medium.

In further another embodiment, a financial device comprises: a body where a medium input/output unit is formed; a registered medium storage box in which registered media to be withdrawn is stored; a discrimination part recognizing registered medium information of the registered media to be withdrawn; and a control part re-registering the registered media remaining in the registered medium storage box when the registered media stored in the registered medium storage box is withdrawn into the entrance part according to withdrawal request of the registered medium, and portions or all of the registered media withdrawn into the entrance part are not received.

The details of one or more embodiments are set forth in the accompanying drawings and the description below. Other features will be apparent from the description and drawings, and from the claims.

DETAILED DESCRIPTION

Figure 1:
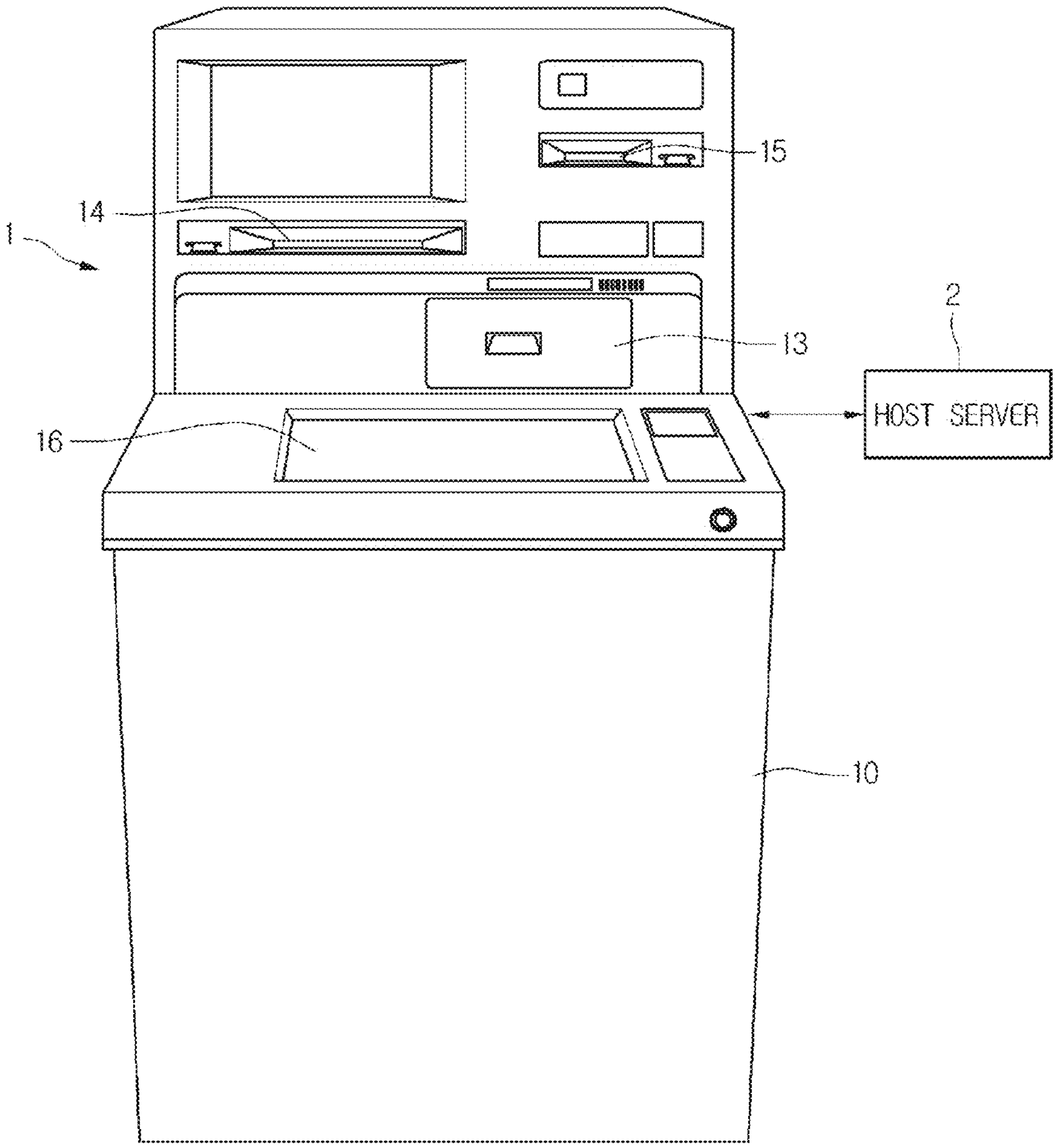
FIG. 1 is a perspective view of a financial device according to a first embodiment.

Hereinafter, exemplary embodiments of the present disclosure will be described with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via, another component.

A financial device according to embodiments is a device that performs financial businesses, i.e., medium processing comprising processing such as deposit processing, giro receipt, or gift certificate exchange and/or processing such as withdrawal processing, giro dispensing, or gift certificate dispensing by receiving various media such as, e.g., paper moneys, bills, giros, coins, gift certificates, etc. For example, the financial device may comprise an automatic teller machine (ATM) such as a cash dispenser (CD) or a cash recycling device. However, the financial device is not limited to the above-described examples. For example, the financial device may be a device for automatically performing the financial businesses such as a financial information system (FIS).

Hereinafter, assuming that the financial device is the ATM, an embodiment will be described. However, this assumption is merely for convenience of description, and technical idea of the present disclosure is not limited to the ATM.

Figure 2:
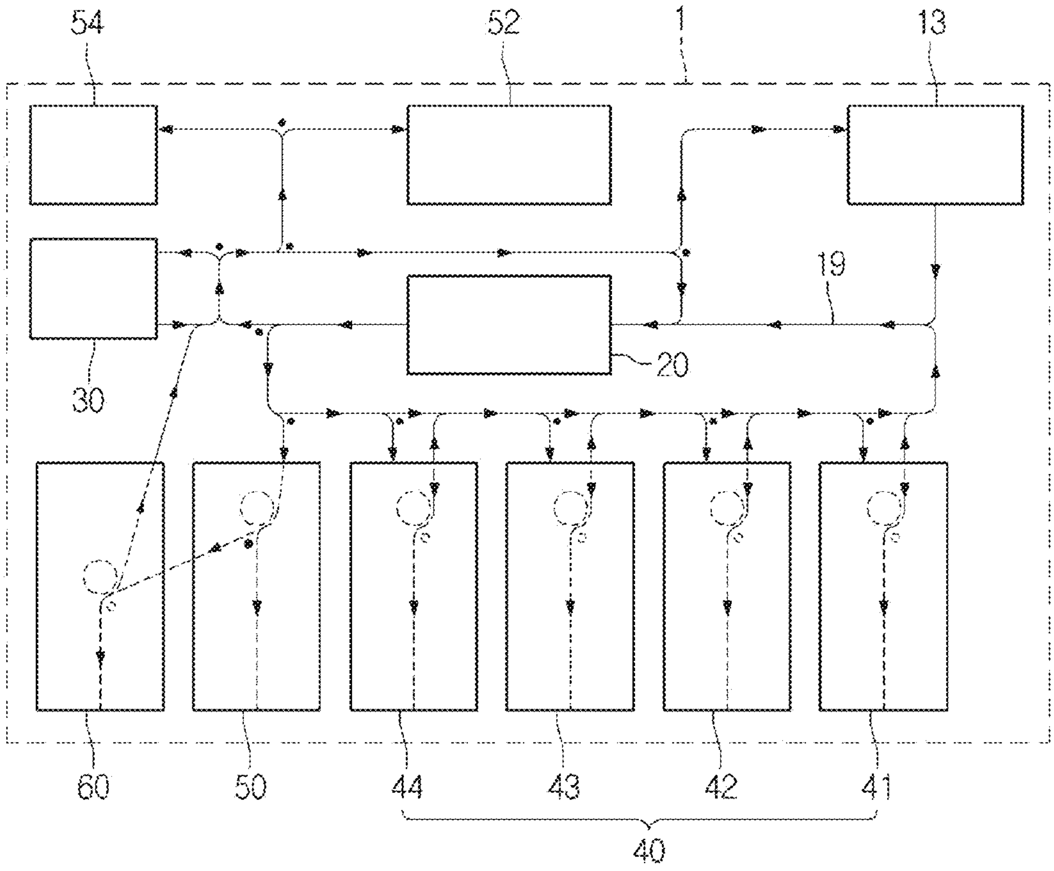
FIG. 2 is a schematic view of the financial device according to the first embodiment.

FIG. 1 is a perspective view of a financial device according to a first embodiment, and FIG. 2 is a schematic view of the financial device according to the first embodiment.

Referring to FIGS. 1 and 2, a financial device 1 according to a first embodiment may communicate with a host server 2. The financial device 1 may transmit financial processing information into the host server 2 and receive customer information from the host server 2. The host server 2 may store the financial processing server transmitted from the financial device 1.

The financial device 1 comprises a main body 10 in which a plurality of parts are disposed. The main body 10 comprises a medium entrance part 13 through which a medium is deposited or withdrawn.

The media according to the current embodiment may be classified into a registered medium and an unregistered medium. The registered medium represents a medium of which registration is required so as to withdraw the medium from the financial device 1. The registered medium may comprise checks, marketable securities, tickets, bills, and the like. If a medium is a medium of which registration is required, the present disclosure is not limited to a kind of medium.

The unregistered medium represents a medium of which registration is not required. For example, the unregistered medium may be a bill.

Information (registration information) to be registered of the registered medium may comprise a serial number, the sum (face amount) of money, an image, and the like. Here, the registration information may vary according to a kind of medium to be registered.

Also, a storage box for storing the registered medium may be referred to as a registered medium storage box (or a first storage box), and a storage box for storing the unregistered medium may be referred to as an unregistered medium storage box (or a second storage box).

The medium entrance part 13 comprises a medium accommodation space that is accessible by a customer. The medium accommodation space may be opened or closed by a blocking member such as a shutter or a cover. Alternatively, the medium accommodation space may be maintained in an opened state without being closed. Also, the registered medium and the unregistered medium may be accepted into the medium entrance part 13 at the same time or successively accepted into the medium entrance part 13. That is, the medium entrance part 13 may serve as a common entrance part 13 for the registered medium and the unregistered medium. Also, a bundle or sheet of at least one kind of registered medium and unregistered medium may be accepted into the medium entrance part 13. Also, a bundle of at least one kind of registered medium and unregistered medium may be withdrawn from the medium entrance part 13. Also, the registered medium and unregistered medium may be accepted into or withdrawn from the medium entrance part 13 in the same direction. Also, the registered medium and unregistered medium may be accepted in regardless of front and rear directions of the registered medium and unregistered medium. Also, the medium entrance part 13 may comprise a separation unit that separates the bundle of accepted registered medium and unregistered medium into a sheet of registered medium and unregistered medium.

Here, the acceptance or withdrawal of the registered medium and unregistered medium in the same direction represents the acceptance and withdrawal of the registered medium and unregistered medium in a transverse or longitudinal direction. The transverse direction represents a direction parallel to a short side having a short length of the registered medium and unregistered medium, and the longitudinal direction represents a direction parallel to a long side having a long length of the registered medium and unregistered medium. Also, the insertion of the registered medium and unregistered medium regardless of the front and rear directions of the registered medium and unregistered medium represents acceptance of the registered medium and unregistered medium regardless of which one of front and back surfaces of the registered medium and unregistered medium faces an upper side.

Also, the financial device 1 may further comprise a bankbook entrance part 14 through which a bankbook is taken in or out, a card entrance part 15 through which a card is taken in or out, and a customer control part 16 displaying financial processing information.

The financial device 1 may further comprise a discrimination part 20. The discrimination part 20 may distinguish a kind of media or determine faulty media when media are taken in or out. In the current embodiment, the discrimination part 20 may discriminate states of the registered medium and unregistered medium. A transfer part 19 for commonly transferring the registered medium and unregistered medium may be disposed between the medium entrance part 13 and the discrimination part 20. The discrimination part 20 may comprise at least one of an optical character reader (OCR) and a magnetic ink character reader (MICR).

The financial device 1 may further comprise a temporary stacker 30 in which the unregistered medium is temporarily stacked. The temporary stacker 30 temporarily stacks the unregistered medium taken in through the medium entrance part 13 when the customer deposits the unregistered medium into the financial device 1. The unregistered medium stacked in the temporary stacker 30 is transferred into an unregistered medium storage box 41, 42, or 43 that will be described later when the customer finally determines the take-in of the unregistered medium.

The financial device 1 may further comprise a medium storage box 40 for storing media. The medium storage box 40 may comprise the at least one unregistered medium storage box 41, 42, or 43 and at least one registered medium storage box 44. This specification is not limited to the number of unregistered medium storage boxes 41, 42, and 43 and registered medium storage box 44.

The unregistered medium storage box 41, 42, or 43 may comprise a medium inlet through which the transferred registered medium is accepted and a medium outlet through which the unregistered medium integrated within the unregistered medium storage box 41, 42, or 43 is withdrawn. In general, the medium inlet and the medium outlet may be disposed in an upper end of the box defining an outer appearance of the unregistered medium storage box 41, 42, or 43.

Also, a medium stacker for parallely stacking unregistered media transferred from the unregistered medium storage box 41, 42, or 43 and a pick-up unit for separating the unregistered media one by one to transfer the separated unregistered medium to the outside of the unregistered medium storage box 41, 42, or 43 are provided within the unregistered medium storage box 41, 42, or 43. That is, the unregistered medium stored in the unregistered medium storage box 41, 42, or 43 may be withdrawn to the outside, and the deposited unregistered medium may be stored in the unregistered medium storage box 41, 42, or 43. The specific constitution of the unregistered medium storage box 41, 42, and 43 may be realized as the previously known constitution. In this specification, the structure of the unregistered medium storage box 41, 42, or 43 and whether the unregistered medium is withdrawn or accepted are not limited to the above-described example.

The medium storage box 40 may be disposed in a direction parallel to a gravity direction so that the media are stacked in the gravity direction. The medium storage box 40 may be disposed on the bottom of the inside of the financial device 1. In a case where the financial device 1 comprises the plurality of unregistered medium storage boxes 41, 42, and 43, the plurality of unregistered medium storage boxes 41, 42, and 43 may be disposed parallel to each other. For another example, the plurality of unregistered medium storage boxes 41, 42, and 43 may be disposed vertically.

The registered medium storage box 44 may be disposed parallel to the plurality of unregistered medium storage boxes 41, 42, and 43. For another example, the registered medium storage box 44 may be disposed perpendicular to the plurality of unregistered medium storage boxes 41, 42, and 43. A registered medium to be withdrawn may be stored in the registered medium storage box 44. A structure of the registered medium storage box 44 will be described with reference to the accompanying drawings.

The financial device 1 may further comprise a registered medium deposit box 54. A registered medium that is normally deposited may be stored in the registered medium deposit box 54. The registered medium deposit box 54 and the registered medium storage box 44 may be provided as separate modules. For another example, the registered medium deposit box 54 and the registered medium storage box 44 may be provided in a single storage box. However, an inner space of the single storage box may be partitioned into a space in which the registered medium to be deposited is stored and a space in which the registered medium to be withdrawn is stored.

The financial device 1 may further comprise a first recovery box 50 in which a unregistered or registered medium that is determined as a faulty unregistered or registered medium during the deposit process is stored, a second recovery box 52 in which an unregistered or registered medium that is determined as a faulty unregistered or registered medium during the withdrawing process is stored, and a recovery supplement box 60. Each of the first and second recovery boxes 50 and 52 may be provided in plurality. Also, the first and second recovery boxes 50 and 52 may be uses as a registered medium recovery box and an unregistered medium recovery box, respectively.

The recovery supplement box 60 may supplement the unregistered or registered medium into the unregistered medium storage boxes 41, 42, and 43 or the registered medium storage box 44 and recovers the unregistered or registered medium from the unregistered medium storage boxes 41, 42, and 43 or the registered medium storage box 44. Alternatively, the financial device 1 may further comprise a third recovery box (not shown) in which the medium withdrawn into the medium entrance part 13 to withdraw the medium is recovered when the medium is not received by the customer.

The recovery boxes 50 and 52 and the recovery supplement box 60 may be omitted in the financial device 1. Also, the present disclosure is not limited to the number of recovery boxes 50 and 52 and the number of recovery supplement box 60.

Although not shown, the financial device 1 may further comprise the teller control part for confirming state information of the financial device 1 or inputting a command by a teller. For example, the teller control part may be disposed on a rear surface of the financial device 1. The teller control part may comprise a display unit for inputting a command through a touch manner and displaying a screen or an input part for inputting a command and a display unit for displaying information. Since a structure of the teller control part can be realized by the previously known technologies, its detailed descriptions will be omitted.

Figure 3:
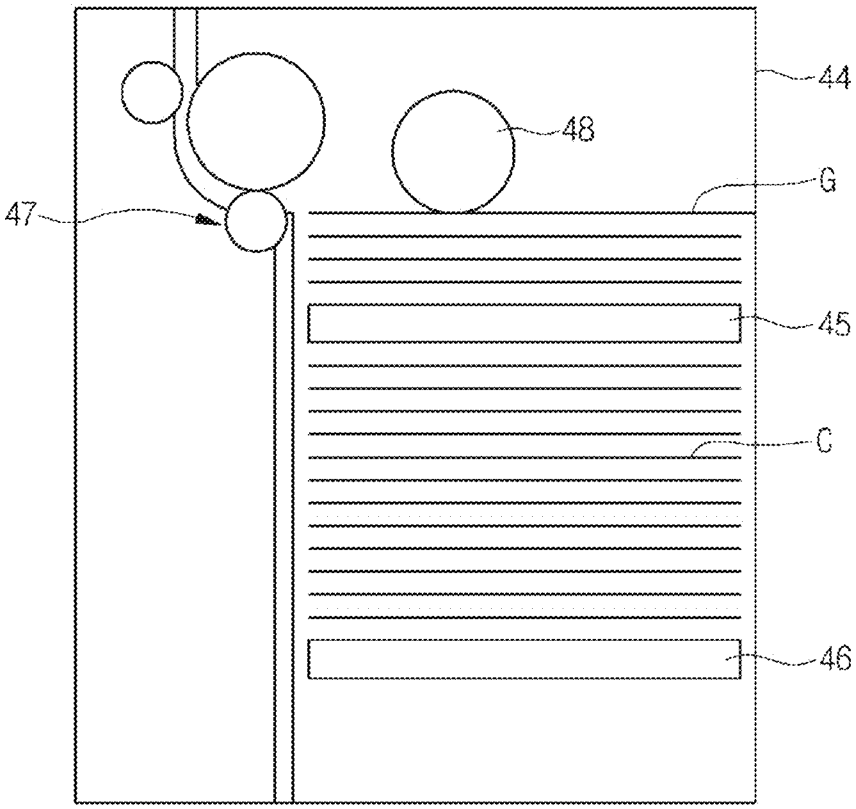
FIG. 3 is a schematic view of a registered medium storage box according to the first embodiment.

FIG. 3 is a schematic view of a registered medium storage box according to the first embodiment.

Referring to FIG. 3, a registered medium G to be deposited and a registered medium C to be withdrawn may be stored in the registered medium storage box 44 according to the first embodiment. That is, the registered medium storage box 44 may perform a registered medium storage function for withdrawing and a function as a registered medium temporary stacker for temporary stacking the registered medium G to be deposited.

The registered medium storage box 44 may comprise a first supporter 45 for supporting the registered medium G to be deposited, a second supporter 46 for supporting the registered medium C to be withdrawn, a pick-up roller 48 for withdrawing the registered medium, and a transfer unit 47 for transferring the medium.

The registered medium C to be withdrawn is stacked between the first supporter 45 and the second supporter 46. Also, the registered medium G may be disposed above the first supporter 45. A space between the first supporter 45 and the second supporter 46 may be referred to as a registered medium storage space. The first and second supporters 45 and 46 may vertically move by independent driving parts, respectively. For another example, the second supporter 46 may vertically moves by a driving part, and the first supporter 45 may be connected to an elastic member (not shown). The elastic member may provide an elastic force for moving the first supporter 45 downward into the first supporter 45. In this case, the first supporter may be maintained in a state of FIG. 3 in a state where an external force is not applied into the first supporter 45. Also, when the second supporter 46 moves up, a force of the second supporter during moving up 46 may be transmitted into the first supporter 45 by the registered medium C to be withdrawn, and thus the first supporter 45 may move up. Here, the first supporter 45 may not interfere with the pick-up roller 48 and move up to a position higher than a lowest position of the pick-up roller 48.

Also, when the first supporter 45 operates by the driving part, the first supporter 45 may move up to a position higher than the lowest position of the pick-up roller 48.

If the registered medium G to be deposited and the registered medium C to be withdrawn are separately stored within the registered medium storage box 44 in the current embodiment, the present disclosure is not limited to the above-described example. For example, various structures may be applied into the current embodiment.

According to the current embodiment, since the registered medium G to be deposited is temporarily stacked in the registered medium storage box 44, it is unnecessary to provide a separate temporary stacker for the registered medium. For another example, the financial device 1 may further comprise a separate registered medium temporary stacker for temporarily stacking the registered medium. Alternatively, the registered medium to be deposited may be temporarily integrated in the unregistered medium temporary stacker.

To process the registered medium by using the financial device 1, and more particularly, to withdraw the registered medium through the financial device 1, information of a registered medium to be withdrawn should be registered in the financial device 1.

Here, it is required that the registered medium information is accurately registered in the financial device 1. Hereinafter, a method for controlling a financial device to inhibit registered medium information from being misregistered will be described. Also, a check will be described below as an example of the registered medium.

Figure 4:
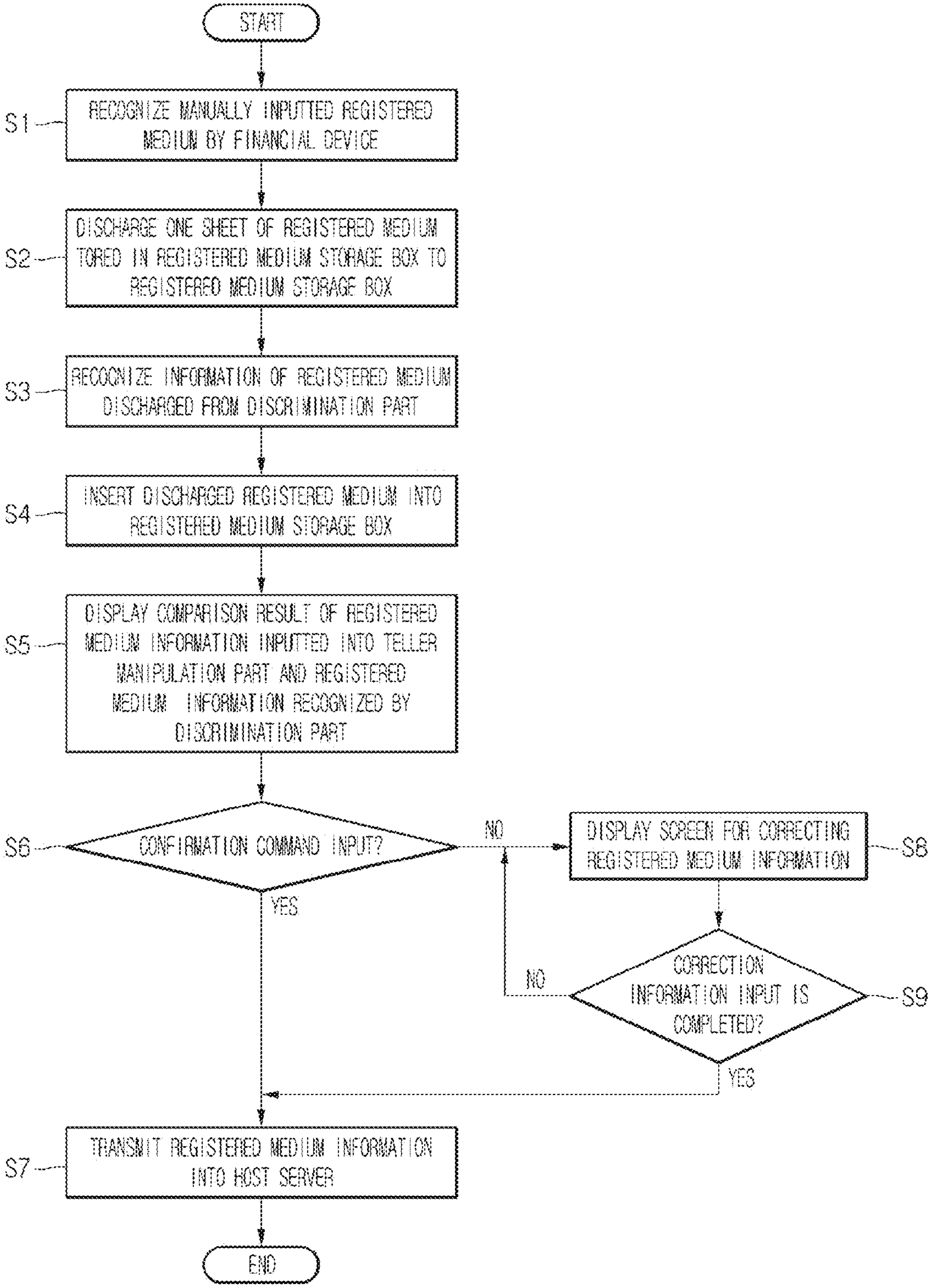
FIG. 4 is a flowchart illustrating a process of controlling the financial device according to the first embodiment.
Figure 5:
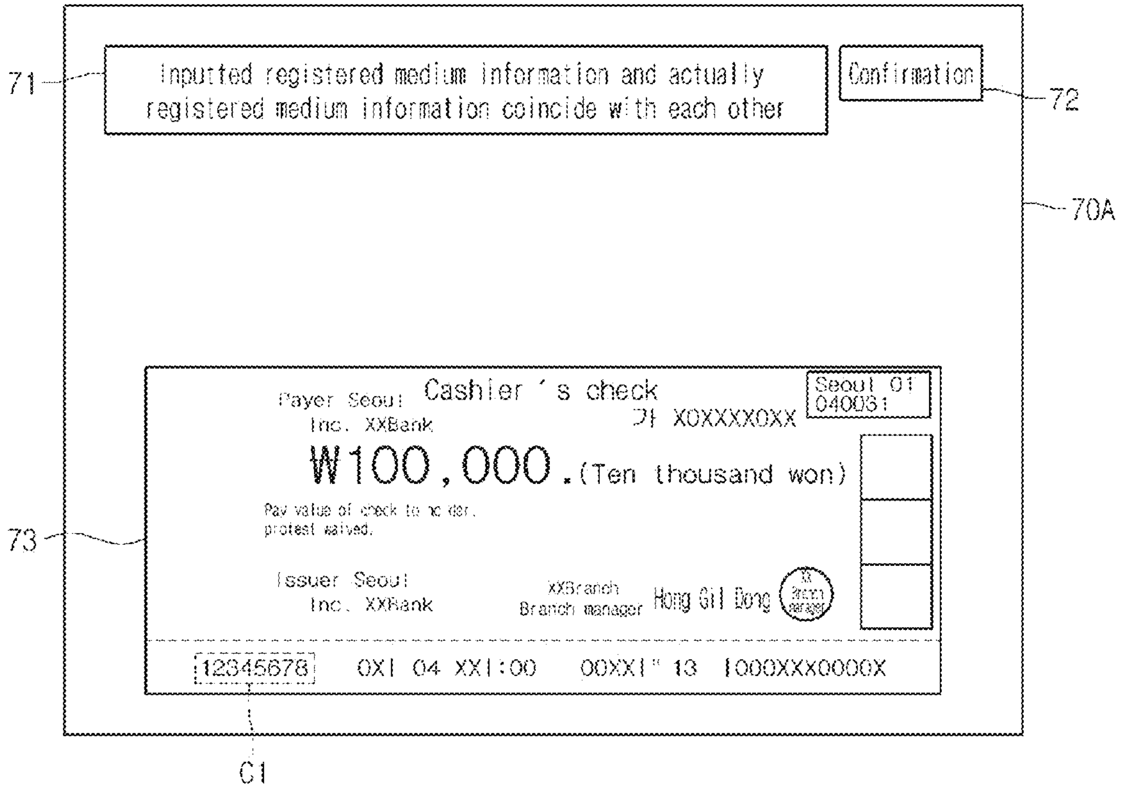
FIGS. 5 to 7 are views of a screen displayed on a teller control part according to the first embodiment.
Figure 6:
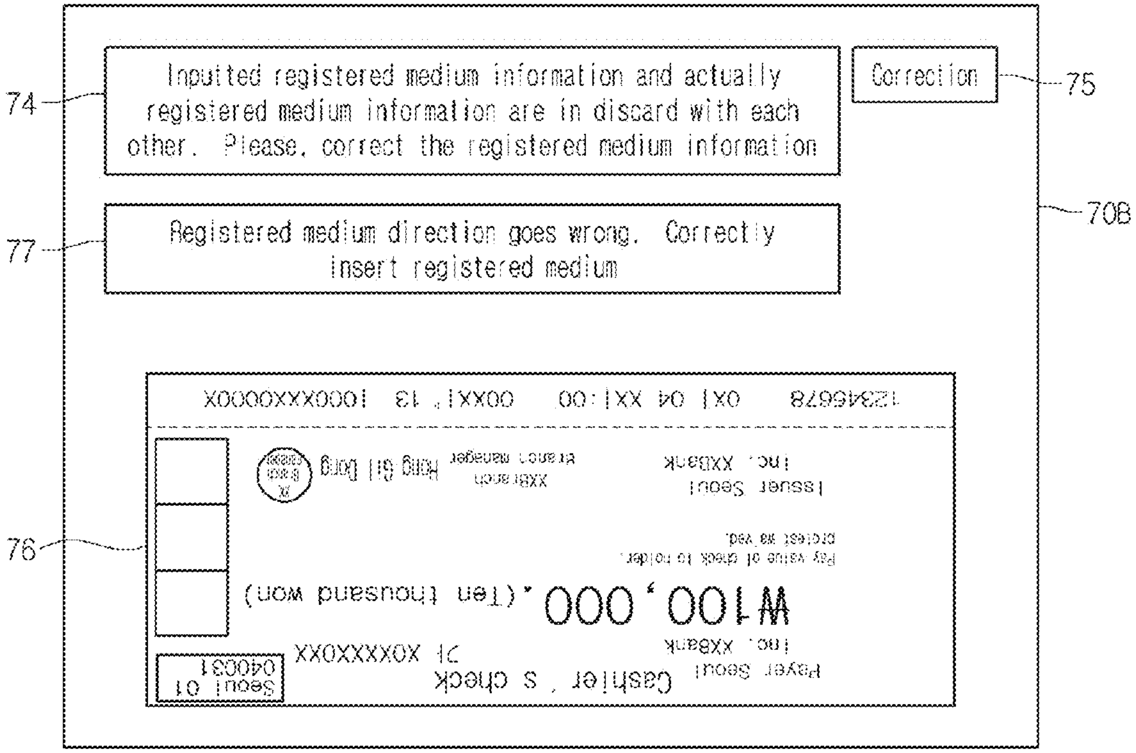
Figure 7:
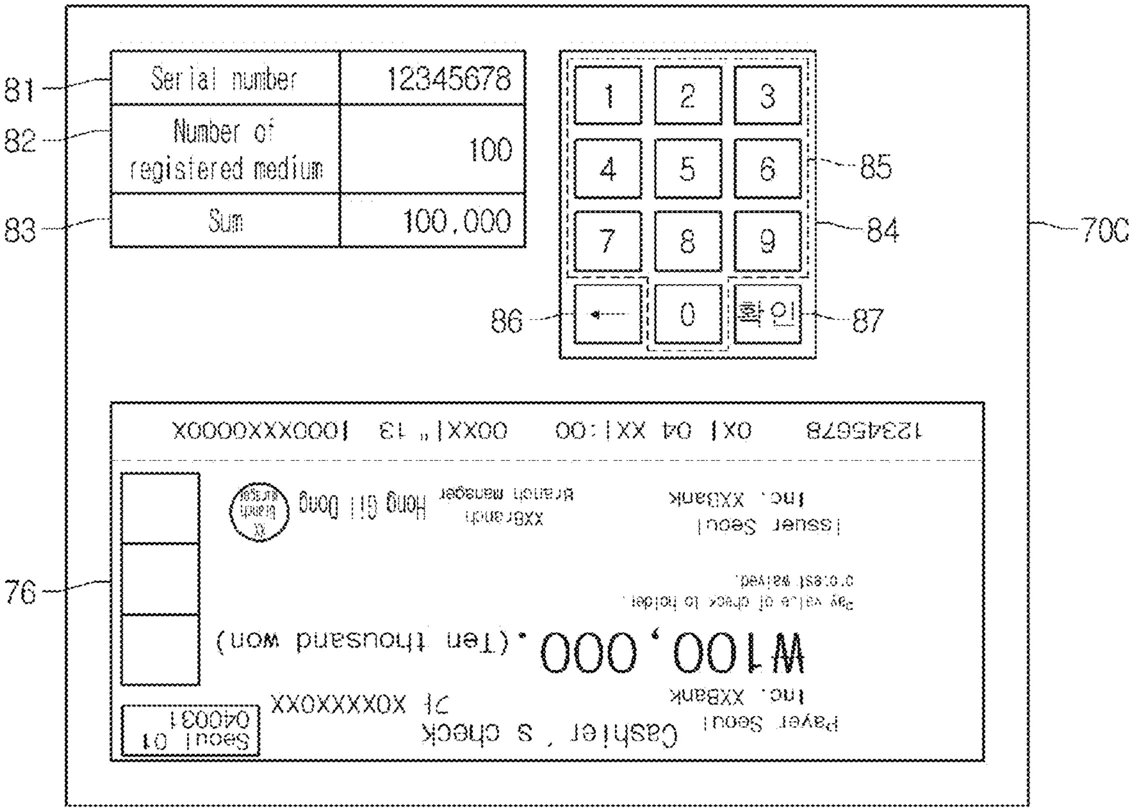

FIG. 4 is a flowchart illustrating a process of controlling the financial device according to the first embodiment, and FIGS. 5 to 7 are views of a screen displayed on a teller control part according to the first embodiment. FIG. 5 illustrates a screen when registered medium information is identical to actual registered medium information. FIG. 6 illustrates a screen when inputted registered medium information is different from the actual registered medium information. Also, FIG. 7 illustrates a screen for inputting the registered medium information.

Referring to FIGS. 4 to 7, a financial device 1 stores information of a registered medium that is manually inputted (S1). In the current embodiment, for example, the information of the registered medium may be inputted through a teller control part. In the current embodiment, the information of the registered medium inputted into the financial device 1 may comprise a serial number (see reference symbol C1 of FIG. 5) of the registered medium, the sum of registered medium, and the number of registered medium stored in a registered medium storage box 44. Here, the serial number of the registered medium may be a serial number of the uppermost registered medium (a registered medium withdrawn first from the registered medium storage box when the registered media are withdrawn) of registered media stored in the registered medium storage box 44.

In general, since the registered media stored in the registered medium storage box 44 has continuous serial numbers, when a serial number and sheet of the uppermost registered medium (hereinafter, referred to as a "registered medium to be initially withdrawn) of the registered media stored in the registered medium storage box are inputted, a serial number of remaining registered media may be automatically recognized by the financial device 1.

For another example, when the registered media are registered, the registered media may be separately registered into a plurality of groups. For example, if 50 sheets of registered media from number 1 to number 50 may be designated as a first group, 100 sheets of registered media from number 101 to number 200 may be designated as a second group. In this case, a serial number of each of registered media and total 500 sheets of registered media are registered in the financial device.

When the financial device 1 receives and stores the registered medium information, the financial device 1 performs a process (operations S2 to S4) for recognizing a serial number of a registered medium to be initially withdrawn.

That is, one sheet of registered medium (the registered medium to be initially withdrawn) stored in the registered medium storage box 44 is withdrawn from the registered medium storage box 44 (S2). In this specification, the registered medium to be initially withdrawn may be a registered medium disposed closest to a medium outlet of the registered medium.

The registered medium withdrawn from the registered medium storage box 44 passes through a discrimination part 20. Also, the discrimination part 20 recognizes a serial number and sum information of the registered medium withdrawn from the registered medium storage box 44 (S3). Then, the registered medium passing through the discrimination part 20 is accepted again into the registered medium storage box 44 (S4). In the current embodiment, the discrimination part 20 may recognize the unregistered medium as well as the registered medium. Thus, when the registered medium withdrawn from the registered medium storage box 44 passes through the discrimination part 20 and then is accepted again into the registered medium storage box 44, since a transfer path of the registered medium is shortened during the reentrance of the registered medium, a time that is taken to return again to the registered medium storage box 44 after the registered medium is withdrawn from the registered medium storage box 44 may be shorted. Thus, a time taken for registering the medium to be registered may be reduced. This may be achieved when a withdrawal path of the unregistered medium and a withdrawal path of the registered medium in the financial device are the same.

Also, a control part (not shown) may compare the registered medium information that is manually inputted to registered medium information that is recognized and acquired by the discrimination part 20.

Then, the control part controls a display unit of the teller control part to display screens 70A and 70B (that are screens for registering the medium to be registered) thr illustrating comparison results of the registered medium information that is manually inputted and the actually registered medium information that is recognized and acquired by the discrimination part 20. In the current embodiment, the screen for registering the registered medium to be withdrawn may be a screen on which the registered medium information that is manually inputted and the registered medium information acquired by the control part are reflected.

Referring to FIG. 5, when a serial number and sum of the registered medium that is manually inputted and a serial number and sum of the registered medium recognized by the discrimination part 20 identical to each other, an identity result screen 70A is displayed on the display unit of the teller control part.

Information 71 for informing that the inputted registered medium information and the registered medium information recognized by the discrimination part 20 may be displayed on the identity result screen 70A. For example, words "inputted registered medium information and actually registered medium information are identical to each other" may be displayed. The current embodiment is not limited to a method, position, and content of the information for informing that the inputted registered medium information and the actually registered medium information are identical to each other.

Also, a confirmation button 72 for inputting a confirmation command (a registration command for registering) may be further disposed on the identity result screen 70A. Also, image information 73 of the registered medium acquired by the discrimination part 20 may be further displayed on the identity result screen 70A.

For another example, the inputted registered medium information and the actually registered medium information recognized by the discrimination part 20 are comparably displayed on the identity result screen 70A.

In this case, whether the information recognized by the discrimination part 20 is accurate may be confirmed by the teller. If the information for informing that the inputted registered medium information and the registered medium information recognized by the discrimination part 20 are identical to each other is displayed, or the actually inputted registered medium information and the registered medium information recognized by the discrimination part 20 are different from each other, and also the inputted information goes wrong, the inputted registered medium information may be corrected. That is, a correction button 75 for selecting information correction may be further displayed on the coincidence result screen 70A. The screen on which the correction button 75 is displayed will be described with reference to FIG. 6. If the inputted registered medium information is accurate, and the information recognized by the discrimination part 20 is inaccurate, it may be unnecessary to correct the inputted registered medium information.

Referring to FIG. 6, when serial number and sum information of the inputted registered medium and serial number and sum information of the registered medium recognized by the discrimination part 20 are different from each other, a difference result screen B may be displayed on the display unit.

Information 74 for informing that the inputted registered medium information and the information recognized by the discrimination part 20 are different from each other may be displayed on the difference result screen B. For example, words "inputted registered medium information and actually registered medium information are different from each other. Please, correct the registered medium information" may be displayed. The current embodiment is not limited to a method, position, and content of the information for informing that the inputted registered medium information and the actually registered medium information are different from each other.

A correction button 75 for correcting the inputted registered medium information may be displayed on the difference result screen 70B. Also, image information 76 of the registered medium acquired by the discrimination part 20 may be further displayed on the difference result screen 70B.

Here, an image of the registered medium required by the discrimination part 20 may have orientation. As shown in FIG. 6, when information 77 for informing that the registered medium turns inside out, or the registered medium puts the cart before the horse may be further displayed. A registered medium date drawn of the registered medium is printed by a printing device (not shown) when the registered medium is withdrawn from the financial device 1. As shown in FIGS. 5 and 6, a position on which the date drawn is printed should be previously determined on the registered medium. When the disposition (or direction) of the registered medium stored in the registered medium storage box 44 is misplaced, the date drawn may be printed on a position different from the position on which the date drawn should be printed.

Thus, in the current embodiment, to inhibit the printed position of the date drawn from being different, information 77 for informing that the registered medium direction goes wrong may be further displayed on the screens 70A and 70B. For example, the information 77 for informing that the registered medium direction goes wrong may comprise words "registered medium direction goes wrong. Correctly insert registered medium". Thus, the teller confirms the information 77, and then takes the registered medium stored in the registered medium storage box 44 out. Then, the teller may correctly insert the registered medium into the registered medium storage box 44.

Then, it is determined whether the confirmation button 72 is selected on the screen 70A (whether a confirmation command is inputted) (S6). If it is determined that the confirmation button 72 is inputted, the registered medium information is registered in the financial device 1, and the registered medium information is transmitted into the host server 2 (S7). Also, the financial device 1 is maintained in a standby state for withdrawing the registered medium.

In the current embodiment, one of the screens of FIGS. 5 and 6 may be displayed on the teller control part. A case in which it is determined that the confirmation command is not inputted in operation S6 may be a case in which the correction button 75 is inputted on the screen of FIG. 6.

Thus, when the correction button 75 is inputted, a correction screen 70C for correcting the inputted registered medium information is displayed on the teller control part (S8).

Referring to FIG. 7, a serial number 81 of the inputted registered medium, the number 82 of registered medium, and the sum 83 of registered medium may be displayed on the correction screen 70C. An input unit 84 for inputting the registered medium information may be further displayed on the correction screen 70C. The input unit 84 may comprise a numerical button 85 for inputting a number, a cancel button 86 for canceling the inputted number, and a confirmation button 87 pushed when the correction is completed.

When information to be corrected is pushed on the screen of FIG. 7, an information input window is activated. Also, when numbers are inputted by using the numerical button 85, the inputted number information is displayed. For example, even though a serial number of actually registered medium is "12345678", when the inputted number of registered medium is "12345679", the teller may push a portion on which a serial number 81 of the registered medium is displayed, and then re-inputs the serial number of registered medium by using the numerical button 85.

Then, the control part determines whether the correction information is completely inputted (S9). Also, when it is determined that the input of the correction information is completed, the registered medium information is registered in the financial device 1, and the registered medium information is transmitted into the host server 2 (S7). Also, the financial device 1 is maintained in the standby state for withdrawing the registered medium.

An operation of the financial device 1 when the customer withdraws the registered medium will be simply described. For example, when the customer inputs a command for withdrawing 3 sheets of registered medium, the financial device 1 automatically recognizes a serial number of registered medium and serial numbers of remaining two sheets of registered medium. For example, when a serial number of first registered medium is "12345678", a serial number of second registered medium is recognized as a serial number "12345679", and a serial number of third registered medium is recognized as a serial number "12345680".

According to the current embodiment, the actually registered medium stored in the registered medium storage box is acquired while passing through the discrimination part, a screen for registering the registered medium to be withdrawn on which the registered medium information inputted by the teller and the acquired registered medium information are reflected is displayed on the display unit. Thus, the teller may confirm whether the registered medium information is mis-typed and whether the registered medium information acquired by the discrimination part is accurate. Since the teller may correct the mis-typed registered medium information or the registered medium information required by the discrimination part, it may inhibit the registered medium information from being misregistered in the financial device and the host server. Thus, since the registered medium information and the actually withdrawn registered medium information are identical to each other when the registered medium is withdrawn from the financial device, it may inhibit the registered medium withdrawn by the customer from being processed as an unregistered medium or incident registered medium. Thus, inconvenience of the customer may be solved, and transaction stability of the financial device with respect to the customer may be secured.

That is, in a case of a general device for depositing or withdrawing a registered medium, whether information is normally inputted is not automatically confirmed unless the teller corrects the mis-typed registered medium after the teller confirm the mis-typed registered medium by using a naked eye. Also, when the mis-typed registered medium is registered in the financial device and the host server, since all of the registered media withdrawn from the financial device may be recognized as the unregistered medium or incident registered medium. Thus, the customer may be accidently misunderstood as an incident registered medium holder. In addition, when the customer holds the unregistered medium or incident registered medium, this case is more trouble. However, according to the current embodiment, since the financial device recognizes the registered medium stored in the registered medium storage box and displays a screen for registering so that the teller checks the registered medium, the transaction stability and the reliability of the financial device may be secured.

Figure 8:
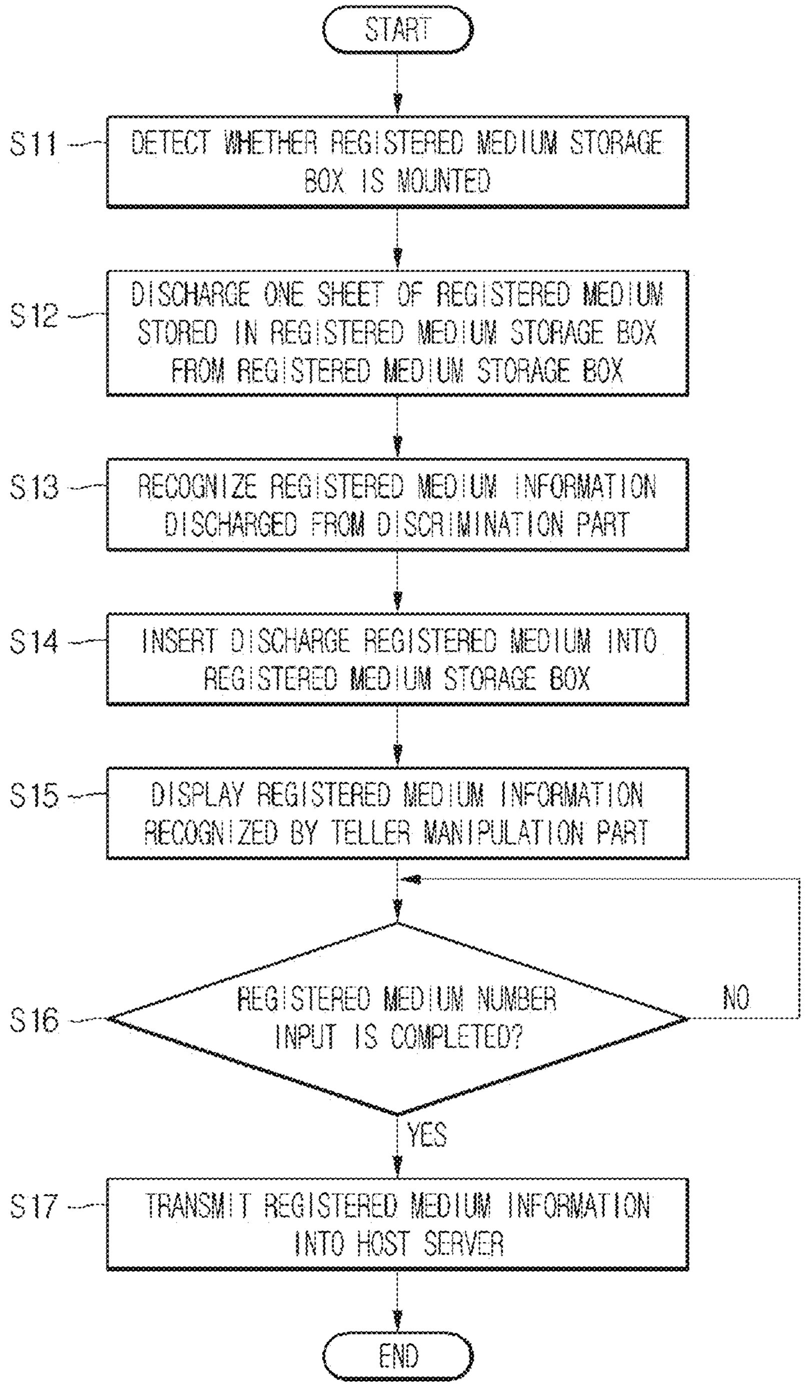
FIG. 8 is a flowchart illustrating a process of controlling a financial device according to a second embodiment.
Figure 9:
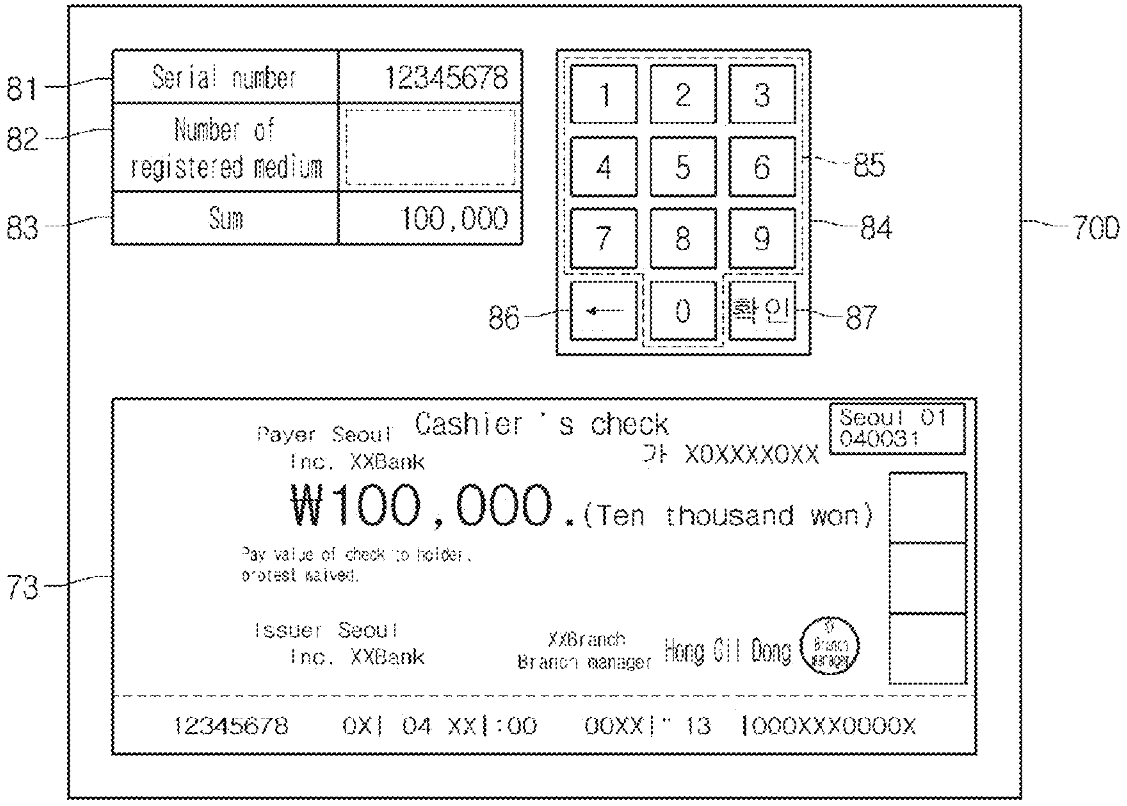
FIG. 9 is a view of a screen displayed on a teller control part according to a second embodiment.

FIG. 8 is a flowchart illustrating a process of controlling a financial device according to a second embodiment, and FIG. 9 is a view of a screen displayed on a teller control part according to a second embodiment.

The current embodiment is equal to the first embodiment except tier a method for inhibiting registered media information from being misregistered. Thus, only specific portions of the current embodiment will be described below.

Referring to FIG. 8, when a teller mounts a registered media storage box 44 in a financial device 1, the financial device 1 detects that the registered media storage box 44 is mounted (S11). Although not shown, the financial device 1 may further comprise a detection part for detecting the mounting of the registered media storage box 44. In general, the teller previously confirms a serial number, sum, and sheet of registered media to be initially withdrawn before the registered media storage box 44 is mounted.

When the mounting of the registered media storage box is detected, the financial device 1 performs processes (operations S12 to S14) for recognizing the serial number of registered media that is initially withdrawn.

That is, one sheet of registered media (a registered medium to be withdrawn initially) stored in the registered media storage box 44 is withdrawn from the registered media storage box 44 (S12). The registered medium withdrawn from the registered medium storage box 44 passes through a discrimination part 20. Also, the discrimination part 20 acquires serial number and sum information of the registered medium withdrawn from the registered medium storage box 44 (S13). Then, the registered medium passing through the discrimination part 20 is accepted again into the registered medium storage box 44 (S14).

Then, a control part controls a display unit of a teller control part to display a screen 70D (that is a screen for registering the medium to be registered) for displaying the registered media information recognized and acquired by the discrimination part 20 (S15). In the current embodiment, the screen for registering the registered medium to be withdrawn may be a screen on which the registered medium information acquired by recognizing registered the media through the discrimination part is reflected.

Referring to FIG. 9, a serial number 81 and sum of the registered medium recognized by the discrimination part 20 are displayed on the screen 70D. Also, information to be additionally inputted is displayed on the screen 70D. In the current embodiment, information that is not recognized by the discrimination part 20 should be inputted through an input unit. In the current embodiment, information to be inputted may be the number 82 of registered media.

An input unit 84 for inputting the number of registered media may be further displayed on the screen 70D. The input unit 84 may comprise a numerical button 85 for inputting a number, a cancel button 86 for canceling the inputted number, and a confirmation button 87 pushed when the correction is completed.

Image information of the registered media acquired by the discrimination part may be further displayed on the screen 70D.

The teller may compare a serial number 81 and sum 83 of the registered media displayed on the screen 70D to information (that is information acquired before the registered media storage box is mounted) of an actually registered media. Here, when the information recognized by the discrimination part 20 goes wrong, the registered media information may be corrected. A method for correcting the serial number 81 and sum 83 of the registered media may be performed through the same method described in the first embodiment.

Then, a control part determines whether the number of registered media is completely inputted (S9). Also, when it is determined that the number of registered media is completely inputted, the registered medium information is registered in the financial device 1, and the registered medium information is transmitted into a host server 2 (S16). Also, the financial device 1 is maintained in the standby state for withdrawing the registered medium.

According to the current embodiment, in addition to the advantages described in the first embodiment, since the registered media information stored in the registered media storage box may be recognized by the discrimination part and automatically acquired without inputting the serial number and sum of the registered media by the teller, teller's convenience may be improved.

Figure 10:
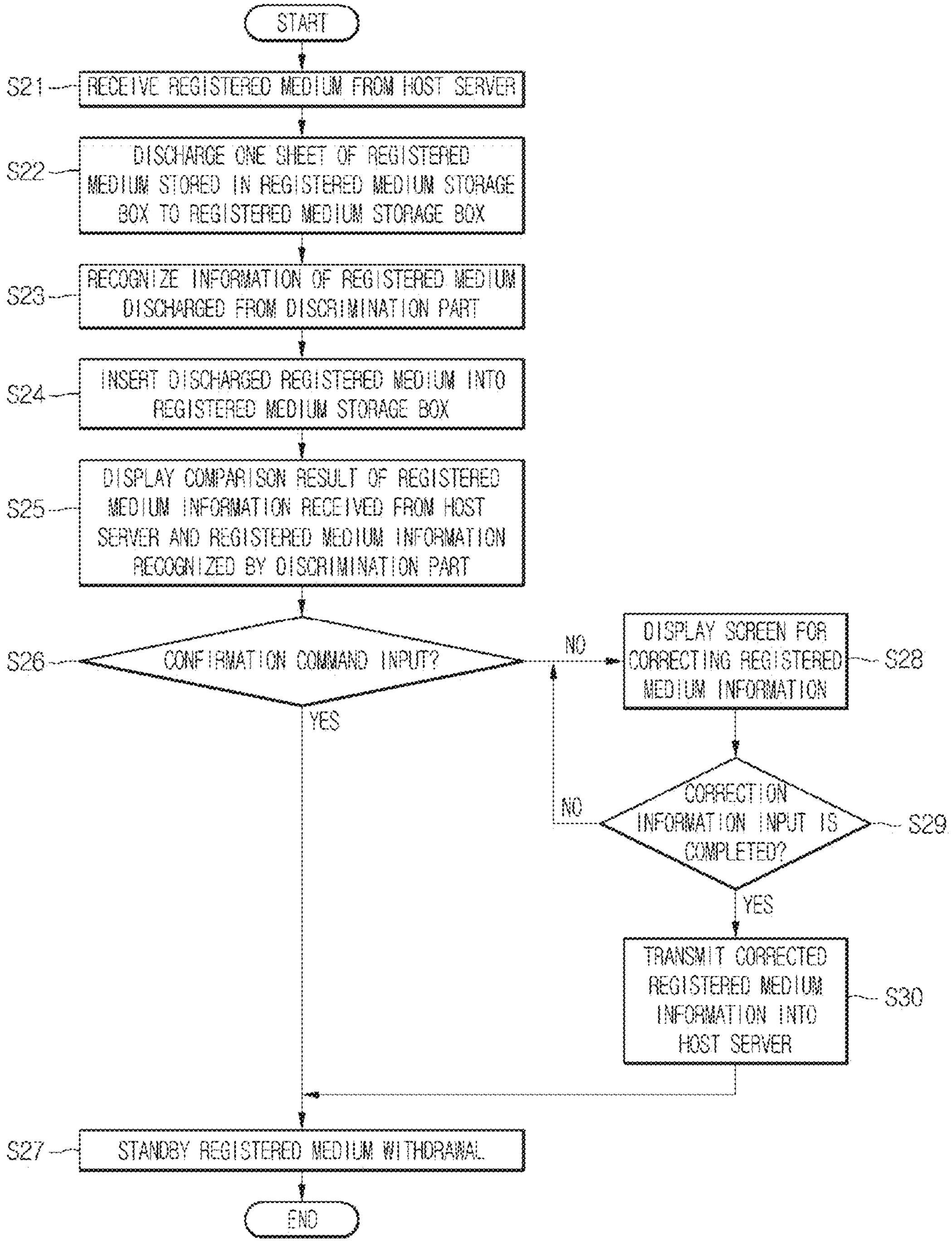
FIG. 10 is a flowchart illustrating a process of controlling a financial device according to a third embodiment.

FIG. 10 is a flowchart illustrating a process of controlling a financial device according to a third embodiment.

The current embodiment is equal to the first embodiment except that a financial device receives registered media information from a host server. Thus, only specific portions of the current embodiment will be described below.

Referring to FIGS. 5 to 7 and 10, a teller may input registered media information through an accounting terminal (not shown) without manually inputting the registered media information into a financial device 1. The registered media information inputted through the accounting terminal is transmitted into the host server 2.

Also, the financial device 1 receives the registered media information inputted by the teller from the host server 2 (or that is referred to as an external device) (S21).

When the financial device 1 receives the registered medium information from the host server 2, the financial device 1 performs a process (operations S22 to S24) for recognizing a serial number of a registered medium to be initially withdrawn.

That is, one sheet of registered media (a registered medium to be withdrawn initially) stored in a registered media storage box 44 is withdrawn from the registered media storage box 44 (S22). The registered medium withdrawn from the registered medium storage box 44 passes through a discrimination part 20. Also, the discrimination part 20 acquires serial number and sum information of the registered medium withdrawn from the registered medium storage box 44 (S23). Then, the registered medium passing through the discrimination part 20 is accepted again into the registered medium storage box 44 (S24). Also, a control part may compare the registered medium information that is manually inputted to the registered medium information that is recognized by the discrimination part.

Then, the control part controls a display unit of the teller control part to display screens 70A and 70B for illustrating comparison results of the registered medium information received from the outside to the actually registered medium information that is recognized and acquired by the discrimination part 20. In the current embodiment, since the screens 70A and B are the same constitute as those of the first embodiment, their detailed descriptions will be omitted.

Then, it is determined whether the confirmation button 72 is selected on the screen 70A (whether a confirmation command is inputted) (S26). If it is determined that the confirmation button 72 is inputted, the registered medium information may be registered in the financial device 1, and the financial device 1 may be maintained in a standby state for withdrawing the registered media (S27).

On the other hand, when it is determined that the confirmation button 72 is not inputted, the teller control part displays a correction screen 70C for correcting the inputted registered media information (S28). Also, the control part determines whether the information to be corrected is completely inputted (S29). Also, when it is determined that the input of the correction information is completed, the corrected registered medium information is registered in the financial device 1, and the corrected registered medium information is transmitted into the host server 2 (S30). Also, the financial device 1 is maintained in the standby state for withdrawing the registered medium.

The above-described registration process of the registered media may be equally applied when the registered media is re-registered after the transaction of the financial device 1 is finished. When the transaction of the financial device is finished, whether registered medium information remaining in the registered medium storage box and the registered medium information stored in a memory of the financial device 1 identical to each other should be confirmed. Thus, when the transaction of the financial device 1 is finished, the inputted registered medium information and the actually registered medium information are compared by the teller. Then, the teller registers the actually registered medium information again.

The financial device 1 may comprise a plurality of registered medium storage boxes. Different sums of registered media may be stored in the plurality of registered medium storage boxes. In this case, a unique ID may be given to each of the registered medium storage boxes. Here, the unique ID of each of the registered medium storage boxes and the information of the registered medium stored in the corresponding registered medium storage box should be identical to each other.

According to the current embodiment, registered medium information for each of the registered medium storage boxes may be inputted by the teller. Also, the financial device 1 may acquire actually registered medium information for each of the registered medium storage boxes.

Although the comparison result of the registered medium information inputted on a display unit of the teller control part and the actually registered medium information recognized by the discrimination part or the actually registered medium information to be recognized by the discrimination part is displayed in the current embodiment, the present disclosure is not limited thereto. For example, the above-described registered medium information may be displayed on a customer control part 16 disposed on a front portion of the financial device 1. Also, the registered medium information may be certificated on the customer control part 16 and then registered by the teller.

In this specification, since the comparison result of the registered medium information displayed on the customer control part or the teller control part and the actually registered medium information recognized by the discrimination part is determined on the bases of the information recognized by the discrimination part, the comparison result may be referred to as information related to the registered medium. Also, the serial number and number of registered medium may be referred to as information related to the registered medium.

Figure 11:
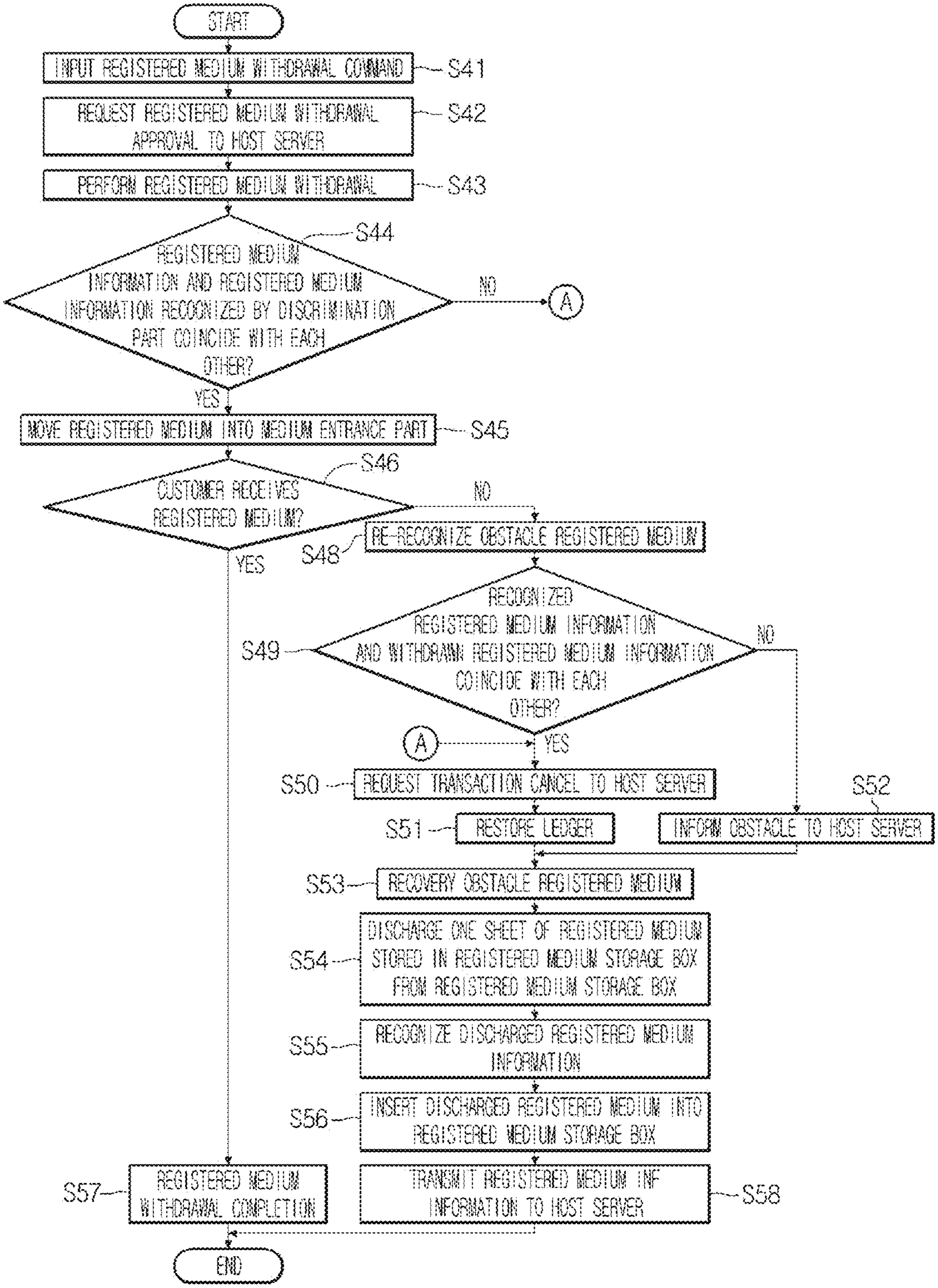
FIG. 11 is a flowchart illustrating a process of restoring registered medium withdrawal errors of the financial device according to the first embodiment.

FIG. 11 is a flowchart illustrating a process of restoring registered medium withdrawal errors of the financial device according to the first embodiment.

A process for withdrawing a registered medium of media will be described with reference to FIG. 11.

Referring to FIG. 11, to withdraw a registered medium, a withdrawal command of the registered medium is inputted through a customer control part 16 (S41). For example, a customer may select a kind of registered medium to be withdrawn together with the sum of registered medium to be withdrawn. As described above, a serial number and number of the registered medium to be stored for withdrawing are registered in a financial device 1.

Then, a control part (not shown) requests withdrawal approval to a host server (S42). That is, the financial device 1 transmits a serial number, sum, and number of the registered medium to be withdrawn together with customer information into the host server 2. Also, the serial number, sum, and number of registered medium to be withdrawn together with the customer information are stored in a memory of the financial device 1.

Also, when the approval information is received from the host server 2, the financial device 1 performs a withdrawal process of the registered medium (S43). Also, when the host server 2 transmits a withdrawal approval response to the financial device 1, the host server 2 records withdrawal transaction information of the registered medium on a transaction ledger.

Particularly, at least one registered medium is withdrawn from the registered medium storage box 44 according to a withdrawal command, and then the withdrawn registered medium passes through the discrimination part 20. When the registered medium passes through the discrimination part 20, the discrimination part 20 may recognize registered medium information of the registered medium. The registered medium information recognized by the discrimination part 20 may comprise an image of the registered medium, a serial number of the registered medium, the sum of the registered medium, and the number of registered medium passing though the discrimination part 20.

Then, the control part determines whether the registered medium information recognized by the discrimination part 20 and the registered medium information of the registered medium withdrawn from the registered medium storage box among previously registered medium information are identical to each other (S44). As described above, the teller may register the registered medium information. If the teller misregisters the registered medium information (generally, a serial number or sum of the registered medium), the registered medium information of the registered medium withdrawn from the registered medium storage box and the registered medium information recognized by the discrimination part 20 among the previously registered medium information are different from each other.

In the operation S44, when the registered medium information recognized by the discrimination part 20 and the previously registered medium information coincide with each other, the registered medium may be transferred into the medium entrance part 13 (S45). The state in which the registered medium is transferred into the medium entrance part 13 may be a state in which the customer is capable of receiving the registered medium.

Then, the control part determines whether the customer receives all of the registered media transferred into the medium entrance part 13 (S46). Although not shown, a sensor for detecting whether the registered medium exists may be provided in the medium entrance part 13. If only one sheet of registered medium remains in the medium entrance part 13, the sensor detects the registered medium. Thus, the control part determines that the customer does not receive the registered medium.

If it is determined that the customer receives all of the registered media, the registered medium withdrawal process is completed (S47). Also, the financial device 1 is maintained in the standby state.

On the other hand, in the operation S46, when it is determined that the customer does not receive the registered medium, the discrimination part 20 recognizes an fault registered medium. In this specification, the registered medium that is not received by the customer may be called a fault registered medium.

That is, the control part may control the registered medium so that the non-reception registered medium remaining in the medium entrance part 13 is transferred into the discrimination part 20 to allow the discrimination part 30 to recognize the non-reception registered medium. The control part determines whether the fault registered medium information recognized by the discrimination part 20 and the withdrawn registered medium information are identical to each other (S49). In the current embodiment, the withdrawn registered medium information may be the whole information of the registered medium withdrawn from the registered medium storage box 44 and transferred into the medium entrance part 13.

Also, when the fault registered medium information recognized by the discrimination part 20 and the withdrawn registered medium information are identical to each other, it is determined that the customer does not receive all of the registered media. Also, when the fault registered medium information recognized by the discrimination part 20 and the withdrawn registered medium information are different from each other, it is determined that the customer does not receive a portion of the registered media. That is, when the customer does not receive all of the registered media, the registered medium withdrawn from the registered medium storage box 44 remains in the medium entrance part 13. Thus, the fault registered medium information recognized by the discrimination part 20 may be equal to the withdrawn registered medium information. On the other hand, when the customer does not receive a portion of the registered media, the number of the fault registered medium information recognized by the discrimination part 20 may be different from that of the withdrawn registered medium information.

In the operation S49, when the recognized fault registered medium information and the withdrawn registered medium information are identical to each other, the control part requests withdrawal transaction cancel of the registered medium information to the host server 2 (S50). Also, the host server 2 transmits the approval information into the financial device 1 to restore a transaction ledger (S51). That is, the transaction ledger is restored before the registered medium is withdrawn.

Also, when the approval information is received from the host server 2, the control part allows the fault registered medium to be recovered into a second recovery box 52 and to re-register the registered medium stored in the registered medium storage box 44 (operations S54 to S57). In the current embodiment, the re-registration process of the registered medium may be referred to as a fault restoring process. In detail, one sheet of registered medium (the registered medium to be initially withdrawn) stored in the registered medium storage box 44 is withdrawn from the registered medium storage box 44 (S54). The registered medium withdrawn from the registered medium storage box 44 passes through a discrimination part 20. Also, the discrimination part 20 recognizes a serial number and the sum information of the registered medium withdrawn from the registered medium storage box 44 (S55). Then, the registered medium passing through the discrimination part 20 is accepted again into the registered medium storage box 44 (S56). That is, the control part withdraws one sheet of registered medium from the registered medium storage box 44 to allow the discrimination part 20 to recognize the registered medium information of the withdrawn registered medium and control the registered medium so that the registered medium passing through the discrimination part 20 is accepted again into the registered medium storage box 44 to re-register the registered medium stored in the registered medium storage box 44 on the basis of the result recognized by the discrimination part 20.

Then, the control part registers the registered medium information in the memory to transmit the registered medium information into the host server (S57). Also, the control part determines whether the approval information is received from the host server 2. Then, when it is determined that the approval information is received, the fault restoration may be completed, and the financial device 1 is maintained in the standby state. The customer may input deposit or withdrawal of the registered medium in the state of the standby state of the financial device 1.

In the operation S49, when the recognized fault registered medium information and the withdrawn registered medium information are different from each other, the control part informs fault information into the host server 2 (S52). That is, the control part transmits customer information together with the information of the registered medium that is received by the customer and the information of the registered medium that is not received by the customer into the host server 2. Thus, the registered medium that is received by the customer and the registered medium that is not received by the customer are registered into the host server 2 as fault registered media. When the registered medium that is received by the customer is registered, since the registered medium may be determined as the fault registered medium when the registered medium received by the customer transacts, the financial incidence may be previously inhibited.

Then, the control part controls the registered medium so that the registered medium that is not received by the customer is recovered into a second recovery box 52 (S53). Then, the control part re-registers the registered medium (operations S54 to S56). Since a process of re-registering the registered medium is described above, their detailed descriptions will be omitted.

For another example, in the operation S49, when the recognized fault registered medium information and the withdrawn registered medium information are different from each other, the control part may transmit the fault information into the host server 2 and request the transaction cancel of the registered medium that is not received by the customer. For example, if the customer intends to withdraw one million won as ten sheets of ten thousand won note, when the customer receives only two sheets of ten thousand won note in one million won, the control part requests withdrawal transaction cancel with respect to eight sheets of ten thousand won note that are not received by the customer to the host server 2. Also, the registered medium that is not received by the customer is recovered into the second recovery box 52. Then, the control part re-registers the registered medium.

In this case, the registered medium that is received by the customer is processed as a registered medium that is normally processed, but is not processed as the fault registered medium. Thus, the customer withdraws two sheets of ten thousand won note, and thus, it is determined as twenty thousand won is withdrawn.

For another example, in the operation S49, when the recognized fault registered medium information and the withdrawn registered medium information are different from each other, the control part may transmits the fault information into the host server 2 and request the withdrawal transaction cancel of the registered medium. In this case, the registered medium that is received by the customer and the registered medium that is not received by the customer may be registered as the fault registered media, and then, the registered medium that is not received by the customer may be recovered into the second recovery box 52. Then, the control part re-registers the registered medium.

For another example, in the operation S49, when the recognized fault registered medium information and the withdrawn registered medium information are different from each other, the control part may transmits the fault information into the host server 2 and request the withdrawal transaction cancel of the registered medium. In this case, it may be determined as the withdrawal transaction of the registered medium by the customer is completed, and the re-deposit transaction of the registered medium that is not received by the customer is completed. Also, the registered medium that is received by the customer is not processed as the fault registered medium, but is processed as the registered medium that normally transacts. Also, the re-deposited registered medium may be stored in the registered medium deposit box 54. Then, the control part re-registers the registered medium.

In the operation S44, when the registered medium information recognized by the discrimination part 20 and the previously registered medium information are different from with each other, the process proceeds to the operation S50.

That is, the financial device 1 requests the withdrawal transaction cancel of the registered medium to the host server 2 so that the registered medium that is received by the customer is not processed as the fault registered medium (incident registered medium) (S50).

Also, the host server 2 transmits the approval information into the financial device 1 to recovery a transaction ledger (S51). That is, the transaction ledger is recovered before the registered medium is withdrawn. Also, the fault registered medium is recovered into the second recovery box 52 (S53). Then, the control part re-registers the registered medium (operations S54 to S57). Since a process of re-registering the registered medium is described above, their detailed descriptions will be omitted.

In the operation S44, when the registered medium information recognized by the discrimination part 20 and the previously registered medium information are different from each other, the control part controls the customer control part 16 so that information with respect to device malfunction is displayed on the customer control part 16. Then, when the re-registration process of the registered medium is completed, the information with respect to the device malfunction is not displayed, and the customer may input the withdrawal command again.

For another example, in the operation S44, when it is determined that the registered medium information recognized by the discrimination part 20 and the previously registered medium information are different from each other, information for informing that the withdrawal of the registered medium is withdrawing may be displayed. Then, after the re-registration process (operation S54 to S57) of the registered medium is completed, the process proceeds to the operation S42 to perform the withdrawal of the registered medium again.

In this specification, when the registered medium information recognized by the discrimination part and the registered medium information corresponding to the registered medium withdrawn from the registered medium storage box among the previously registered medium information are different from each other, the registered medium withdrawn from the registered medium storage box may be referred to as the fault registered medium.

Thus, according to the embodiments, when the information of the registered medium withdrawn from the registered medium storage box and recognized by the discrimination part and the registered medium information corresponding to the registered medium withdrawn from the registered medium storage box among the previously registered medium information are different from each other, the registered medium may be recovered into the registered medium recovery box. Then, since the registered medium stored in the registered medium storage box is re-registered to restore the fault, the operational efficiency of the financial device may be improved, and the customer inconvenience may be minimized.

Also, when all or a portion of the registered media are received by the customer, the registered medium that is not received by the customer may be recovered to re-register the registered medium stored in the registered medium storage box, thereby restoring the fault. Thus, the operational efficiency of the financial device may be improved, and the customer inconvenience may be minimized.

Although the withdrawal of the registered medium is described in the above-described embodiments, the present disclosure is not limited thereto. For example, the embodiments may be equally applied to a case in which the registered medium together with the unregistered medium are withdrawn.

Even though all the elements of the embodiments are coupled into one or operated in the combined state, the present disclosure is not limited to such an embodiment. That is, all the elements may be selectively combined with each other without departing the scope of the invention. Furthermore, when it is described that one comprises (or comprises or has) some elements, it should be understood that it may comprise (or comprise or has) only those elements, or it may comprise (or comprise or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in the computer readable media, which in operation can realize the embodiments of the present disclosure. Examples of the computer readable media are magnetic recording media, optical recording media, and carrier wave media and more.

Although embodiments have been described with reference to a number of illustrative embodiments thereof, it will be understood by those skilled in the art that various changes in form and details may be made therein without departing from the spirit and scope of the invention as defined by the appended claims. Therefore, the preferred embodiments should be considered in descriptive sense only and not for purposes of limitation, and also the technical scope of the invention is not limited to the embodiments. Furthermore, is defined not by the detailed description of the invention but by the appended claims, and all differences within the scope will be construed as being comprised in the present disclosure.

What is claimed is:

1. A financial device comprising:

a registered medium storage box that stores a medium to be registered;

a discrimination part that recognizes information of the registered medium withdrawn from the registered medium storage box;

a display unit that displays a screen on which the registered medium is registered; and a control part that controls the display unit, wherein the control part acquires information of at least one registered medium stored in the registered medium storage box by using the discrimination part, wherein a screen for registering the registered medium on which the acquired registered medium information is reflected is displayed on the display unit, and wherein the control part controls a transfer of the at least one registered medium such that the at least one registered medium withdrawn from the registered medium storage box and passed through the discrimination part is accepted into the registered medium storage box.

2. The financial device of claim 1, wherein the registered medium recognized by the discrimination part among registered media stored in the registered medium storage box is disposed at a position closest to an outlet of the registered medium.

3. The financial device of claim 1, wherein the acquired registered medium information comprises a serial number and sum of the registered medium.

4. The financial device of claim 3, wherein a correction button for correcting the displayed serial number and sum of the registered medium is displayed on the screen for registering the registered medium.

5. The financial device of claim 3, wherein an input unit for inputting the number of registered medium stored in the registered medium storage box is displayed on the screen for registering the registered medium.

6. The financial device of claim 1, wherein the information of the registered medium stored in the registered medium storage box is manually inputted, and comparison result information of an inputted registered medium information and the acquired registered medium information is displayed on the screen for registering the registered medium, or the inputted registered medium information and the acquired registered medium information are comparably displayed on the screen for registering the registered medium.

7. The financial device of claim 6, wherein a correction button for correcting the inputted registered medium information is displayed on the screen for registering the registered medium.

8. The financial device of claim 1, wherein information of the registered medium stored in the registered medium storage box is received from an external device, and comparison result information of the registered medium information received from the external device and the acquired registered medium information is disposed on the screen for registering the registered medium.

9. The financial device of claim 1, wherein image information of the registered medium required by the discrimination part is further displayed on the screen for registering the registered medium, and when the recognized registered medium goes wrong in direction, information for informing the wrong direction is additionally displayed.

10. The financial device of claim 1, wherein information of a registered medium that is not registered by the discrimination part is inputted through an input unit.

11. The financial device of claim 1, further comprising:

a memory in which registered media information of a registered medium that is previously registered as the registered medium to be withdrawn are stored;

a recovery box recovering portions or all of the registered media to be withdrawn, wherein the financial device comprises a control part recovers the registered medium withdrawn from the registered medium storage box into the recovery box when the registered medium information withdrawn from the registered medium storage box and recognized by the discrimination part and the registered medium information corresponding to the registered medium withdrawn from the registered medium storage box among the registered media stored in the memory are different from each other, according to withdrawal request of the registered medium.

12. The financial device of claim 11, wherein, when the registered medium information recognized by the discrimination part and the registered medium information corresponding to the registered medium withdrawn from the registered medium storage box among the registered media stored in the memory are different from each other, the control part re-registers the registered media remaining in the registered medium storage box.

13. The financial device of claim 11, wherein, when the registered medium information recognized by the discrimination part and the registered medium information corresponding to the registered medium withdrawn from the registered medium storage box among the registered media stored in the memory do are different from each other, the control part requests withdrawal transaction cancel to a host server.

14. The financial device of claim 1, further comprising an entrance part through which the registered medium is accessible, wherein, according to withdrawal request of the registered medium, the registered media stored in the registered medium storage box are withdrawn through the entrance part, and when portions or all of registered media withdrawn through the entrance part are not received, the control part re-registers registered media remaining in the registered medium storage box.

15. The financial device of claim 14, further comprising at least one of a recovery box recovering the portion or all of the registered media to be withdrawn and a registered medium deposit box storing a deposited registered medium, wherein the unreceived registered medium is stored in the recovery box or the registered medium deposit box.

16. The financial device of claim 1, wherein the registered medium comprises checks, marketable securities, tickets, or bills.

17. A financial device comprising:

a body where a medium input/output unit is formed;

a registered medium storage box in which a registered medium is stored;

a recovery box in which portions or all of registered media to be withdrawn is recovered;

a discrimination part recognizing registered medium information of the registered medium to be withdrawn;

a memory in which registered medium information of a previously registered medium is stored as the registered medium to be withdrawn; and a control part recovering the registered medium withdrawn from the registered medium storage box into the recovery box when the registered medium information withdrawn from the registered medium storage box and recognized by the discrimination part and the registered medium information corresponding to the registered medium withdrawn from the registered medium storage box among the registered media stored in the memory are different from each other, according to a withdrawal request of the registered medium.

18. The financial device of claim 17, wherein, when the registered medium information recognized by the discrimination part and the registered medium information corresponding to the registered medium withdrawn from the registered medium storage box among the registered media stored in the memory do are different from each other, the control part re-registers the registered media stored in the registered medium storage box.

19. A financial device comprising:

a body where a medium input/output unit is formed;

a registered medium storage box in which registered media are stored;

a discrimination part recognizing registered medium information of the registered media to be withdrawn; and a control part re-registering the registered media remaining in the registered medium storage box when the registered media stored in the registered medium storage box is withdrawn into an entrance part according to a withdrawal request of the registered medium, and portions or all of the registered media withdrawn into the entrance part are not received.

20. The financial device of claim 19, wherein the control part requests cancel of withdrawal transaction to a host server when all of the registered media withdrawn into the entrance part are not received.

21. The financial device of claim 19, wherein the control part informs the received registered medium and the unreceived registered medium as fault registered media when portion of the registered media withdrawn into the entrance part are not received, requests withdrawal transaction cancel with respect to the unreceived registered medium to the host server, or requests deposit transaction with respect to the unreceived registered medium to the host server.

22. The financial device of claim 19, wherein the controls the unreceived registered medium to allow the discrimination part to re-register the unreceived registered medium, and when the re-registered registered medium information of the unreceived registered medium and the registered medium information when withdrawn coincide with each other, the control part determines that all of the registered media are not received, and when the re-registered registered medium information of the unreceived registered medium and the registered medium information when withdrawn are different from each other, the control part determines that portions of the registered media are not received.

* * * * *